United States Patent [19]

Hagersten et al.

[11] Patent Number: 5,923,847
[45] Date of Patent: Jul. 13, 1999

[54] SPLIT-SMP COMPUTER SYSTEM CONFIGURED TO OPERATE IN A PROTECTED MODE HAVING REPEATER WHICH INHIBITS TRANSACTION TO LOCAL ADDRESS PARTITON

[75] Inventors: Erik E. Hagersten, Palo Alto, Calif.; Mark D. Hill, Madison, Wis.

[73] Assignee: Sun Microsystems, Inc., Palo Alto, Calif.

[21] Appl. No.: 08/674,695

[22] Filed: Jul. 2, 1996

[51] Int. Cl.$^6$ .................................................. C06F 15/163
[52] U.S. Cl. ................................ 395/200.45; 395/200.46; 711/152; 711/153
[58] Field of Search ......................... 395/200.43, 200.45, 395/200.44, 200.46; 711/141, 150, 152, 153

[56] References Cited

U.S. PATENT DOCUMENTS

| | | | |
|---|---|---|---|
| 4,240,143 | 12/1980 | Besemer et al. | 395/284 |
| 5,166,674 | 11/1992 | Baum et al. | 395/800.13 |
| 5,669,008 | 9/1997 | Galles et al. | 395/800.12 |

FOREIGN PATENT DOCUMENTS

| | | |
|---|---|---|
| 0 207 876 A2 | 1/1987 | European Pat. Off. . |
| 2 561 009 | 9/1985 | France . |
| 2 156 554 | 10/1985 | United Kingdom . |

OTHER PUBLICATIONS

D. Lenosky, PhD, "The Description and Analysis of DASH Scalable Directory–Based Multiprocessor," *DASH Prototype System*, Dec. 1991, pp. 36–56.

Hagersten et al., "Simple COMA Node Implementations," Ashley Saulsbury and Anders Landin Swedish Institute of Computer Science, 12 page.

Saulsbury et al., "An Argument for Simple COMA," Swedish Institute of Computer Science, 10 page.

Hagersten et al., "Simple COMA," Ashley Saulsbury and Anders Landin Swedish Institute of Computer Science, Jul. 1993, pp. 233–259.

(List continued on next page.)

*Primary Examiner*—Dung C. Dinh
*Attorney, Agent, or Firm*—Conley, Rose & Tayon, PC; B. Noel Kivlin

[57] ABSTRACT

A computer system includes multiple local buses to which processors and other devices may be connected. A repeater is coupled to each of the local buses. Additionally, a top level repeater is coupled to each of the repeaters. The repeaters transmit transactions from the corresponding local buses to the top repeater. The top repeater, based upon the local or global nature of the transaction, transmits the transaction to one or more of the repeaters. The repeaters receiving the transaction then transmit the transaction upon the local buses attached thereto. If the transaction is a local transaction, the top repeater transmits the transaction to those repeaters which are configured into a local domain with the repeater which detected the initial transaction. The local domain comprises one or more repeaters which are logically interconnected. The local buses attached thereto logically form one SMP bus to which devices may be attached. Alternatively, the transaction may be a global transaction. The top repeater transmits the global transaction to all repeaters in the system. Subsequently, the transaction is retransmitted upon all of the local buses. In one embodiment, a transaction is determined to be local or global based upon the address partition containing the address. The address space of the computer system is divided into multiple address partitions. Each partition is defined to be either local or global, and additional properties are defined for each partition.

17 Claims, 6 Drawing Sheets

OTHER PUBLICATIONS

Cox et al., "Adaptive Cache Coherency for Detecting Migratory Shared Data, " Proc. 20$^{th}$ Annual Symposium on Computer Architecture, May 1993, pp. 98–108.

Stenström et al., "An Adaptive Cache Coherence Protocol Optimized for Migratory Sharing," Proc. 20$^{th}$ Annual Symposium on Computer Architecture, May 1993 IEEE, pp. 109–118.

Wolf–Dietrich Weber et al., "Analysis of Cache Invalidation Patterns in Multiprocessors", Computer Systems Laboratory, Stanfor University, CA pp. 243–256.

Kourosh et al., "Two Techniques to Enhance the Performance of Memory Consistency Models, "1991 International Conference on Parallel Processing, pp. 1–10.

Li et al., "Memory Coherence in Shared Virtual Memory Systems," 1986 ACM, pp. 229–239.

European Search Report for Application No. 97304650.1 Nov. 19–97.

Physical Memory

SPLIT-SMP COMPUTER SYSTEM CONFIGURED TO OPERATE IN A PROTECTED MODE HAVING REPEATER WHICH INHIBITS TRANSACTION TO LOCAL ADDRESS PARTITON

BACKGROUND OF THE INVENTION

1. Field of the Invention

This invention is related to the field of symmetrical multiprocessing systems and, more particularly, to a symmetrical multiprocessing system including a hierarchical architecture.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

SUMMARY OF THE INVENTION

The problems outlined above are in large part solved by a computer system in accordance with the present invention. The computer system includes multiple local buses to which processors and other devices may be connected. A repeater is coupled to each of the local buses. Additionally, a top level repeater is coupled to each of the repeaters. The repeaters transmit transactions from the corresponding local buses to the top repeater. The top repeater, based upon the local or global nature of the transaction, transmits the transaction to one or more of the repeaters. The repeaters receiving the transaction then transmit the transaction upon the local buses attached thereto.

If the transaction is a local transaction, the top repeater transmits the transaction to those repeaters which are configured into a local domain with the repeater which detected the initial transaction. The local domain comprises one or more repeaters which are logically interconnected. The local buses attached thereto logically form one SMP bus to which devices may be attached.

Alternatively, the transaction may be a global transaction. The top repeater transmits the global transaction to all repeaters in the system. Subsequently, the transaction is retransmitted upon all of the local buses. In one embodiment, a transaction is determined to be local or global based upon the address partition containing the address. The address space of the computer system is divided into multiple address partitions. Each partition is defined to be either local or global, and additional properties are defined for each partition.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
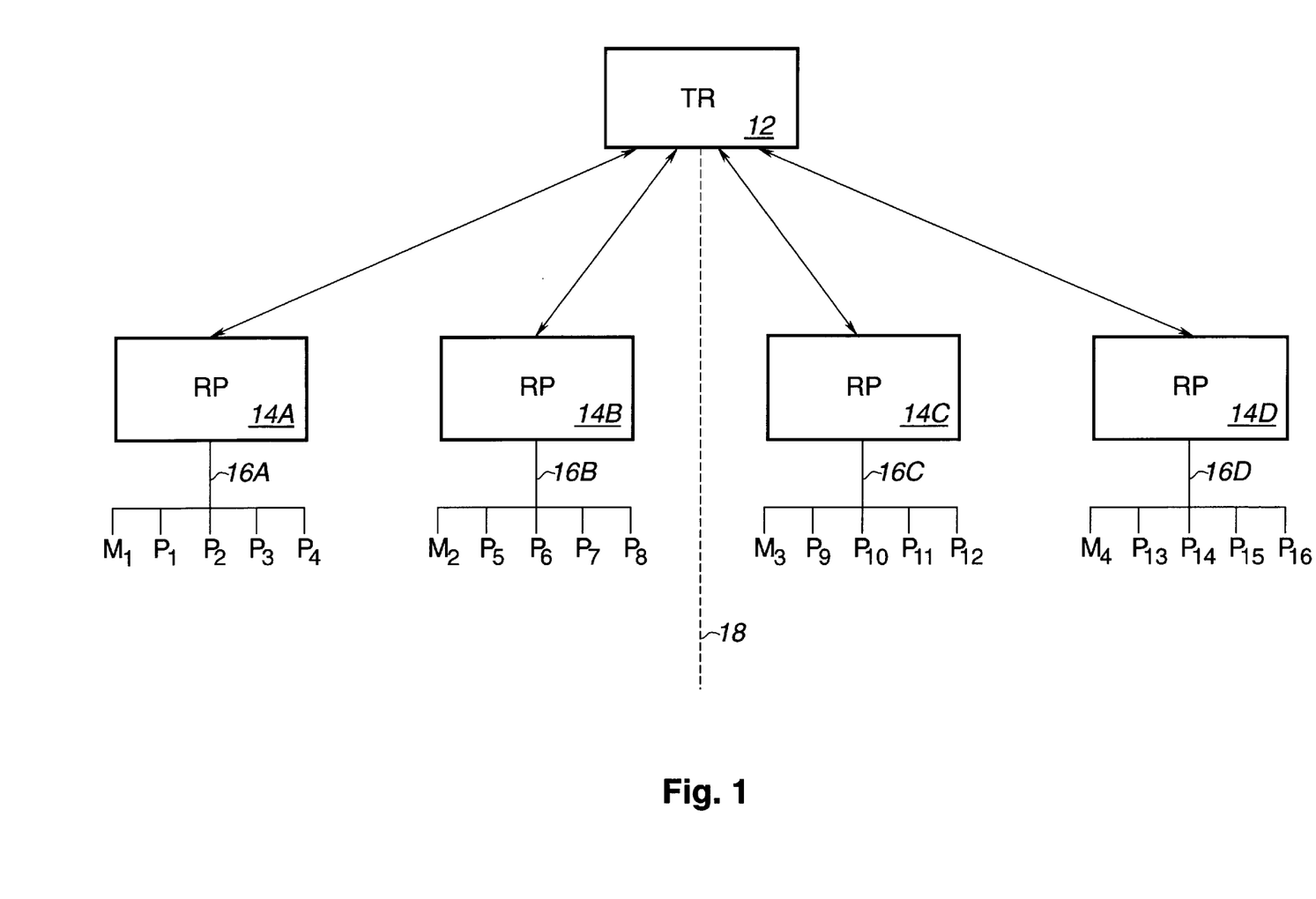
FIG. 1 is a block diagram of one embodiment of a split-SMP computer system.

Turning now to FIG. 1, a block diagram of one embodiment of a split-SMP computer system 10 is shown. As shown in FIG. 1, computer system 10 includes a top repeater 12, repeaters 14A–14D, processors P1–P16 and memories M1–M4. Processors P1–P4 and memory M1 are coupled to a local bus 16A to which repeater 14A is coupled. Similarly, other processors P5–P16 and memories M2–M4 are coupled to local buses 16B–16D, to which respective repeaters 14B–14D are coupled as shown in FIG. 1. Each repeater 14 has a point to point connection with top repeater 12. Elements referred to by a reference number followed by a letter will be collectively referred to herein by the reference number alone. For example, repeaters 14A–14D are collectively referred to as repeaters 14. It is noted that the numbers of various elements as shown and connected in FIG. 1 are exemplary only: any number of various elements may be included in alternative configurations.

Repeaters 14A and 14B are logically interconnected with each other via top repeater 12. In other words, top repeater 12 routes transactions from repeater 14A to repeater 14B and vice-versa. Similarly, repeaters 14C–14D are logically interconnected via top repeater 12. Generally speaking, the logically interconnected repeaters 14A–14B and 14C–14D each form an SMP node by logically combining the local buses 16 coupled thereto into one SMP bus. For example, local buses 16A and 16B are logically combined into a single SMP bus. A transaction initiated upon one of local buses 16A–16B is transmitted by the repeater 14A–14D coupled thereto to top repeater 12. Top repeater 12 forwards the transaction to the other repeater 14A–14B. The repeater 14A–14B receiving the transmitted transaction conveys the transaction upon the respective local bus 16A–16B. Furthermore, the devices attached to the local bus upon which the transaction is initiated do not recognize the transaction (i.e. snoop their caches for cache coherence, provide data from the memory, etc.) until the retransmitting repeater is prepared to retransmit the transaction. In this manner, the devices attached to the logically interconnected repeaters receive a transaction substantially simultaneously. Logically, therefore, the devices are attached to the same local bus despite the physical disconnection between the local buses. In one embodiment, the repeater for the local bus upon which the transaction is initiated does not retransmit the transaction upon that local bus. Instead, a signal is asserted to the devices attached to that local bus to process the transaction. The devices attached thereto maintain a queue of transactions which were initiated locally, such that the transactions may be processed upon receipt of the asserted signal. Additional details will be provided further below.

The repeaters which are logically interconnected may be considered to be a "local domain". The devices within the local domain are involved in every transaction within the local domain. For example, each device within the local domain snoops the coherent transactions performed within the local domain. The devices not included in the local domain are only involved in global transactions which are initiated from the local domain. Because the local domains are independent, the bandwidth of the system may be larger than the bandwidth of a system in which all transactions are global. The higher bandwidth may provide for improved performance of the computer system. It is noted that the embodiment of computer system 10 shown in FIG. 1 includes two local domains. The local domains are separated by a vertical dashed line 18.

In addition to routing transactions between the repeaters 14 comprising a local domain, top repeater 12 detects transactions which are indicated to be global transactions. A global transaction is one which may access memory outside the local domain in which the transaction is initiated. Furthermore, global transactions include transactions which may require transmittal to a local bus outside of the local domain for coherency purposes. In the present embodiment, certain address partitions are defined as detailed further below. From the address partition containing the address presented for a transaction, top repeater 12 may determine if the transaction is global or local. If the transaction is global, then top repeater 12 transmits the transaction to each of the repeaters 14 coupled thereto regardless of the local domain to which the repeaters 14 belong. Similar to local transactions, the repeaters 14 transmit the transaction upon the respective local buses 16 substantially simultaneously. In this manner, computer system 10 as shown in FIG. 1 operates logically as a two level hierarchy comprising two logical local buses (i.e. local buses 16A and 16B and local buses 16C and 16D), and one global interconnection (top repeater 12).

Figure 2:
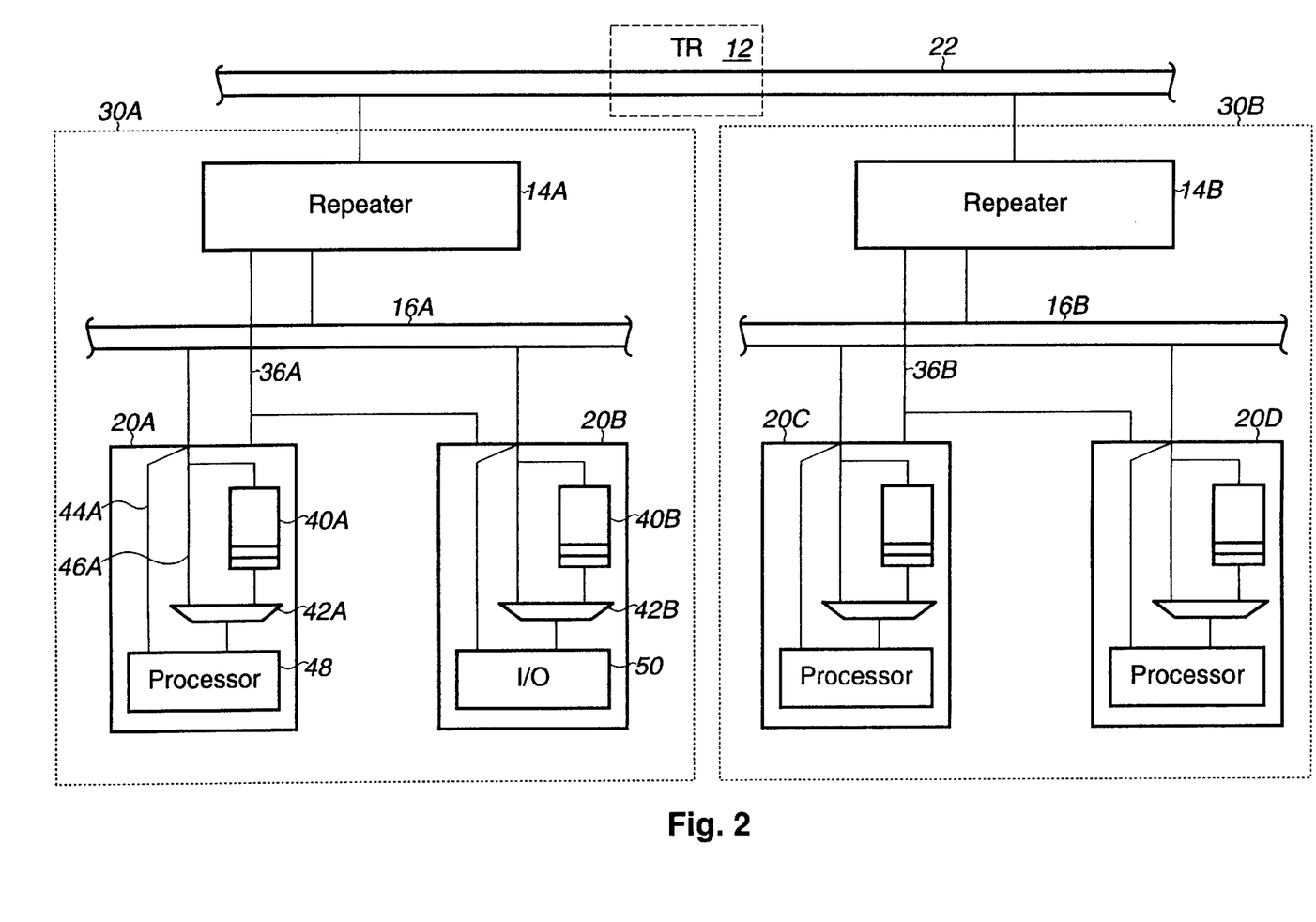
FIG. 2 is a more detailed block diagram of a pair of repeaters according to one embodiment of the split-SMP computer system shown in FIG. 1.

Turning now to FIG. 2, a block diagram depicting repeaters 14A, 14B, and devices coupled thereto is shown. Repeater 14A, local bus 16A, and bus devices 20A and 20B are shown as a node 30A (indicated by a dashed enclosure). Similarly, repeater 14B, local bus 16B, and bus devices 20C and 20D form a node 30B (indicated by a dashed enclosure). Repeaters 14A and 14B are interconnected by an upper level bus 22. Although described with respect to FIG. 2 as an upper level bus 22 for simplicity, the interconnection between the repeaters 14 may comprise any type of interconnection. More particularly, the point to point interconnection of FIG. 1 may be employed, in which upper level bus 22 is actually two point to point connections between the repeaters 14 and top repeater 12 (shown as a dashed enclosure upon FIG. 2).

Bus device 20A is a processor device and includes incoming queue 40A, multiplexor 42A, in addition to the processor element 48A. The processor element 48A may include a high performance processor and a high speed cache memory.

Bus device 20B is an input/output (I/O) bus device. Similar to processor device 20A, I/O bus device 20B includes an incoming queue 40B and a multiplexor 42B in addition to I/O element 50. I/O element 50 may include a bus bridge to a peripheral bus, such as the Peripheral Component Interconnect (PCI) bus. The PCI bus may be used to interface to peripheral devices such as a graphics interface, serial and parallel ports, disk drives, modems, printers, etc. While the embodiment in FIG. 2 shows only two bus devices 20 in each node 30, the number of bus devices 20 may be greater or smaller depending upon the desired configuration. Also, any mixture of processor devices and I/O devices may be present.

Generally speaking, bus devices 20 communicate with each other by sending and receiving bus transactions. Bus transactions may perform either memory or I/O operations. Generally, a memory operation is an operation causing transfer of data from a source to a destination. The source and/or destination may be storage locations within the initiator, or may be storage locations within system memory. When a source or destination is a storage location within system memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In FIG. 2, a memory operation may include one or more transactions upon the buses 16 and bus 22. Bus transactions are broadcast as bit-encoded packets comprising an address, command, and source id. Other information may also be encoded in each packet such as addressing modes or mask information.

I/O operations are similar to memory operations except the destination is an I/O bus device. I/O devices are used to communicate with peripheral devices, such as serial ports or a floppy disk drive. For example, an I/O read operation may cause a transfer of data from I/O element 50 to a processor in processor bus device 20D. Similarly, an I/O write operation may cause a transfer of data from a processor in bus device 20D to the I/O element 50 in bus device 20B. In FIG. 2, an I/O operation may include one or more transactions upon the buses 16 and bus 22.

The architecture shown in FIG. 2 may be better understood by tracing the flow of typical bus transactions. For example, a bus transaction initiated by processor element 48 of bus device 20A is issued on outgoing interconnect path 44A. The transaction is seen as outgoing packet P1(o) on local bus 16A. Each bus device connected to local bus 16A, including the initiating bus device (20A in this example), stores the outgoing packet P1(o) in its incoming queue 40. Also, repeater 14A broadcasts the packet P1(o) onto the bus 22 where it appears as packet P1. The repeaters in each of the non-originating nodes 30 receive the packet P1 and drive it as an incoming packet P1(i) on their respective local buses 16. Since the embodiment illustrated in FIG. 2 only shows two nodes 30, repeater 14B would receive packet P1 on the bus 22 and drive it as incoming packet P1(i) on local bus 16B, in the above example. It is important to note that repeater 14A on the node 30A from which the packet P1 originated as outgoing packet P1(o), does not drive packet P1 back down to local bus 16A as an incoming packet. Instead, when the other repeaters, such as repeater 14B, drive packet P1 on their respective local buses, repeater 14A asserts incoming signal 36A. Incoming signal 36A alerts each bus device in the originating node to treat the packet stored in its incoming queue 40 as the current incoming packet. The repeater 14B in non-originating node 30B does not assert its incoming signal 36B. Thus devices 20C and 20D bypass their incoming queues 40 and receive the incoming packet P1(i) from local bus 16B. Multiplexors 42 are responsive to the incoming signal and allow each device to see either the packet on the local bus 16 or the packet at the head of incoming queue 40 as the current transaction packet.

In the above example, storing the outgoing packet P1(o) in the incoming queues 40 of bus devices 20 in the originating node 30A frees up the local bus 16A to broadcast another outgoing packet while the first packet is being broadcast on the local bus 16 of the other non-originating repeater nodes (30B) and is being presented from the incoming queues 40 in the originating node 30A. Thus, the same bus transaction never appears more than a single time on any given bus, thereby allowing maximum utilization of the bus bandwidth.

Generally speaking, each device on a given local bus 16 stores the outgoing transaction packets that appear on that bus in their incoming queues 40. The repeater 14 for that repeater node broadcasts all outgoing transaction packets to the bus 22 in the same order they appear on the originating local bus 16. The repeater for each repeater node 30 drives packets from the bus 22 on to its local bus 16 as incoming packets only if the packet did not originate from that node 30. If the packet originated from a particular node 30 (the originating node), then that node asserts the incoming signal 36 instead of re-driving the packet during the bus cycle that the other repeaters 14 are driving the packet as an incoming packet. Thus all bus devices 20 see the transaction at the same time. The devices 20 in the originating node see the packet from their incoming queues 40 and devices 20 in non-originating nodes see the packet on their local bus 16 via their respective bypass paths 46 (e.g. bypass path 46A in bus device 20A). Since bus devices 20 in the originating node use their respective incoming queues 40 to view the packet, the local bus 16 in the originating node is free to broadcast another outgoing packet. In this manner, the full bandwidth of the bus 22 may be utilized.

Since outgoing transaction packets are broadcast in the same order as issued (allowing for arbitration between devices) and appear at each device during the same bus cycle, the hierarchical bus structure of the local buses 16, repeaters 14, and bus 22 appears as a single large logically shared bus to the bus devices 20. However, many more bus devices 20 may be supported by the hierarchical structure of FIG. 2, than would be allowable on a single physically shared bus. In one embodiment, the memory physically located in each node 30 (not shown) collectively appears as a single logical memory forming the system memory. The system memory may generally be accessed by any bus device 20.

Figure 3:
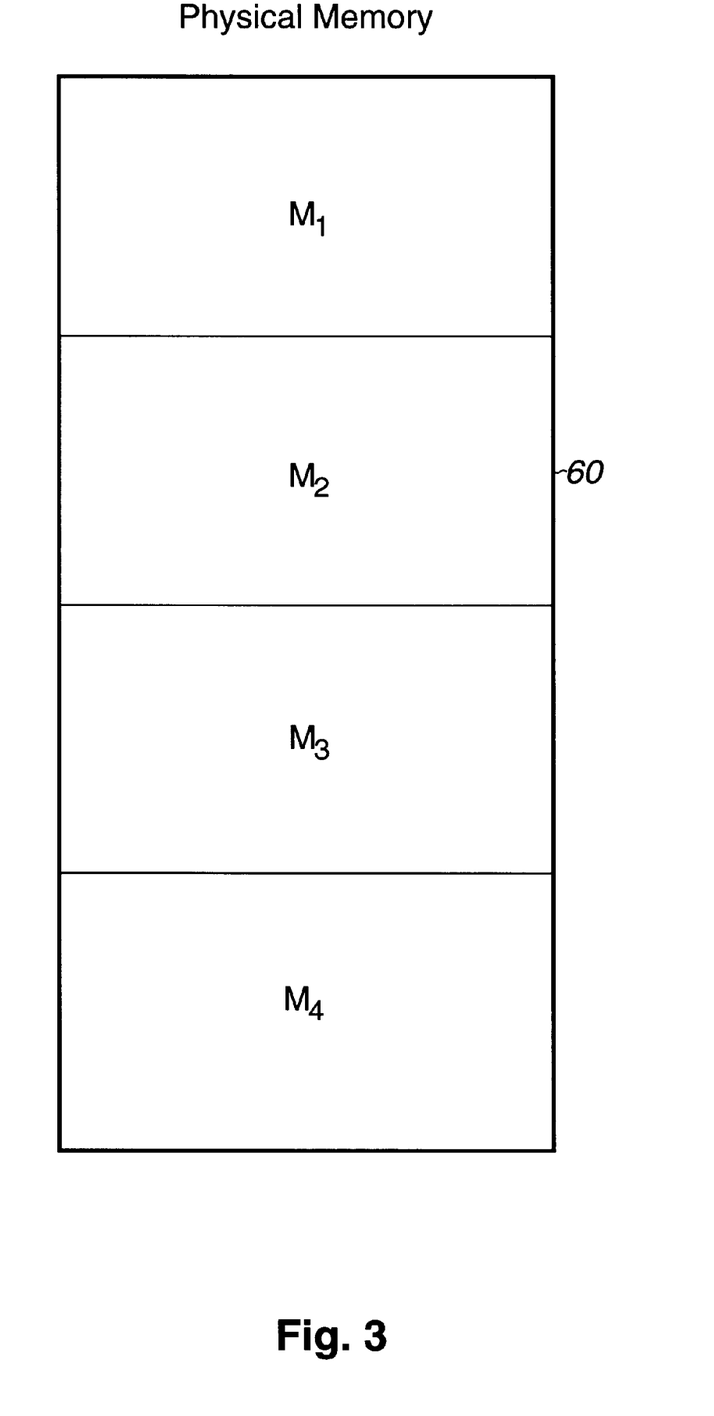
FIG. 3 is a diagram depicting the physical memory included in the split-SMP computer system shown in FIG. 1.

Turning now to FIG. 3, a diagram depicting allocation of the physical memory, or system memory, among the nodes of the multiprocessor system is shown. In one embodiment, the physical memory is equally divided among the processing nodes. Therefore, each of n processing nodes holds 1/n of the total physical memory locations. As illustrated in FIG. 3, in a four node multiprocessing system, physical memory 60 is divided into four local memories (M1 through M4). It is noted that a multiprocessing system could allocate the memory in different proportions between the nodes. More particularly, a first node may include a first amount of memory, a second node may include a second amount of memory dissimilar from the first amount, etc.

Figure 4:
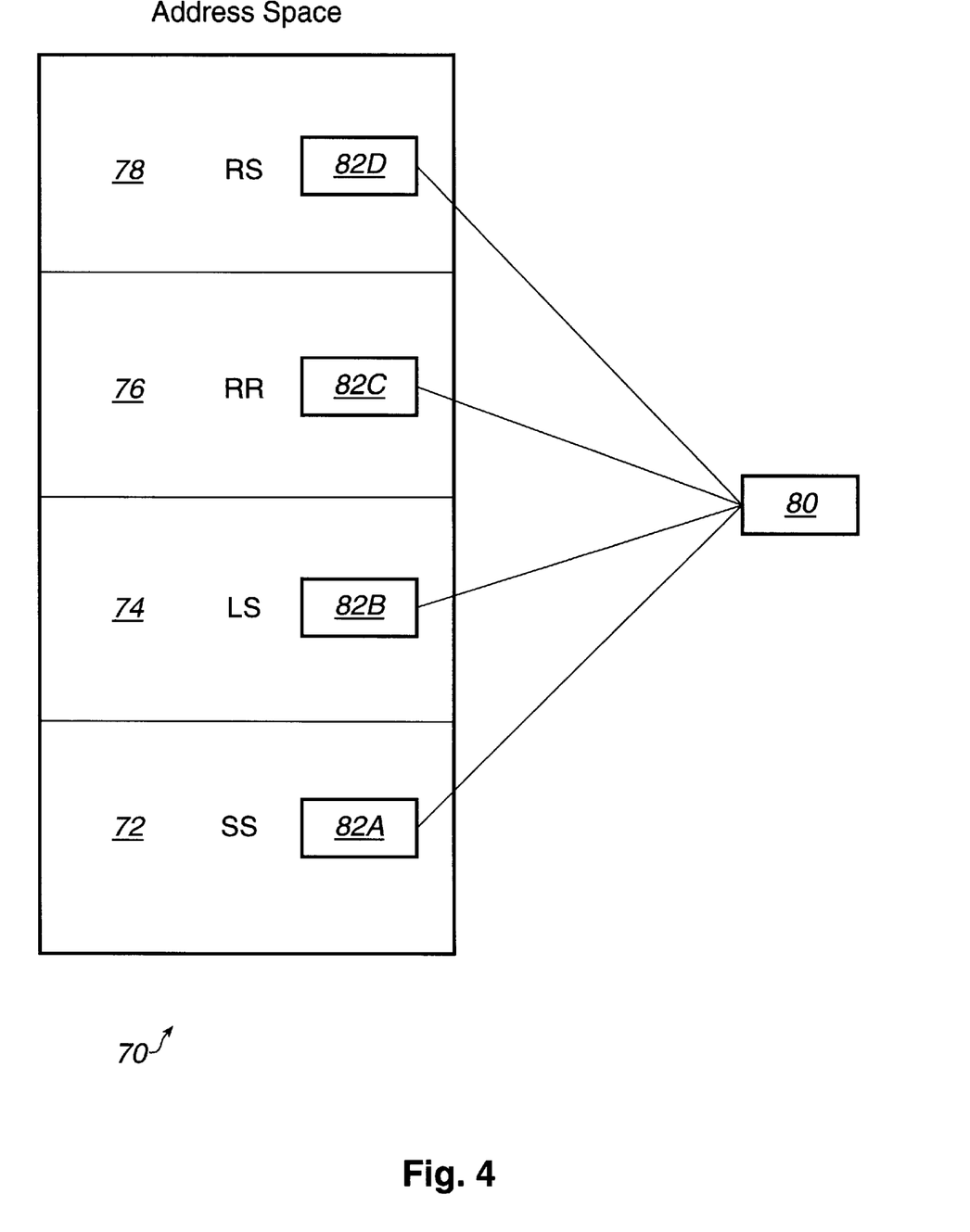
FIG. 4 is a diagram depicting the address space of the computer system shown in FIG. 1, highlighting certain address partitions within the address space.

Referring now to FIG. 4, each memory location is mapped to multiple locations within an address space 70. Address space 70 is comprised of multiple address partitions. Each physical memory location can be accessed using a plurality of address aliases (i.e., one from each partition). For example, a location 80 may be mapped to a location 82A within SS space 72, a location 82B in LS space 82B, a location 82C within RR space 76, and a location 82D within RS space 78.

In one embodiment, address space 70 includes four address partitions: SMP-space 72 (SS), local-space 74 (LS), remote read space 76 (RR), and remote space 78 (RS). Each address partition is assigned properties which repeater 12 uses to control the transfer of data in the hierarchical structure. The properties of each address partition are discussed in more detail below.

SS address partition 72 is the global address partition. Address aliases in this address partition are broadcast globally to all repeaters 14. Therefore, accesses to a physical memory location not within a particular local domain should use an SS address alias to access those memory locations. In addition, accesses to a memory location within the local domain but designated as global memory should use an SS address alias. Local memory may be designated as global memory if a process in a different local domain requires access to that memory.

LS address partition 74 is the local address partition. An address alias from LS address partition 74 may only be used to access the portion of memory that is allocated to that local domain. An access using an LS address alias to a physical memory location not within the local domain causes a trap when doing a page table walk or TLB access. In the present embodiment, the operating system maintains a per processor or per node page table structure. A processor may only access translations stored in the processor's page table structure (or the page table structure of the node containing the processor). The trap occurs due to the fact that the translation does not exist within the page table structure of the initiating processor.

RR address partition 76 is used to read data from remote addresses. In one embodiment, processes running on a node may use RR address partition 76 to perform a read-stream transaction from a remote address. Read-stream is a transaction performed in response to execution of a block read instruction defined by the SPARC architecture to transfer data without caching the data. Similarly, RS address partition 78 is used to perform read-stream and write-stream transactions to remote memory. Write stream is a transaction performed in response to a write-block instruction defined by the SPARC architecture.

The address partitions are used to restrict and control the flow of data within computer system 10. Top repeater 12 decides whether to broadcast a transaction to all repeaters 14 or to limit it to a local domain of repeaters based on the address partition of the transaction. For example, if a node 30 attempted to address data stored in a memory location allocated to another node 30, an SS address alias should be used to access the data. When repeater 12 receives a transaction with an SS address alias, it broadcasts the transaction to each repeater 14. In contrast, if a node 30 attempts to access a memory location within the local domain which is not shared with other nodes outside the local domain, an LS address alias should be used. When repeater 12 receives an LS address alias, it does not broadcast the transaction to non-local repeaters 14.

An issue arises when a process migrates from one node in computer system 10 to another node. Process migration occurs when a process originally assigned to one node is suspended and later reassigned to another node. Memory that was local to the process when originally assigned may no longer be a local. For example, if a process is originally assigned to a first node 30 and later reassigned to a second node 30 which is not logically local with the first node 30, what was originally local memory to the process is now remote (i.e. allocated to a different local domain). The process, however, may not be aware that the memory location is no longer local. If the process attempts to access a memory location local to first node 30 using an LS address alias, a trap will occur. The trap occurs because the translation for the virtual address corresponding to the LS address alias is not contained within the page table structure accessed by the second node 30. A trap transfers control to the operating system. The operating system moves the data that was attempted to be accessed from first node 30 to second node 30 using RR 76 address aliases and local (LS) writes. The memory can then be accessed using an LS address alias. The use of a hierarchical affinity scheduler, which reduces the migration of processes from one node to another, can minimize the occurrence of moving data blocks from one node to another.

An alternative to copying the data from one node to another is to change the translation of the address from local to global. For example, the following process may be used:

(1) Invalidate the local translation in all local translation tables;

(2) Invalidate the translations in the TLBs (e.g. perform a TLB shootdown);

(3) Flush all cache lines within the page for all processors in the local node; and (4) Create a new, global translation for the page.

Figure 5:
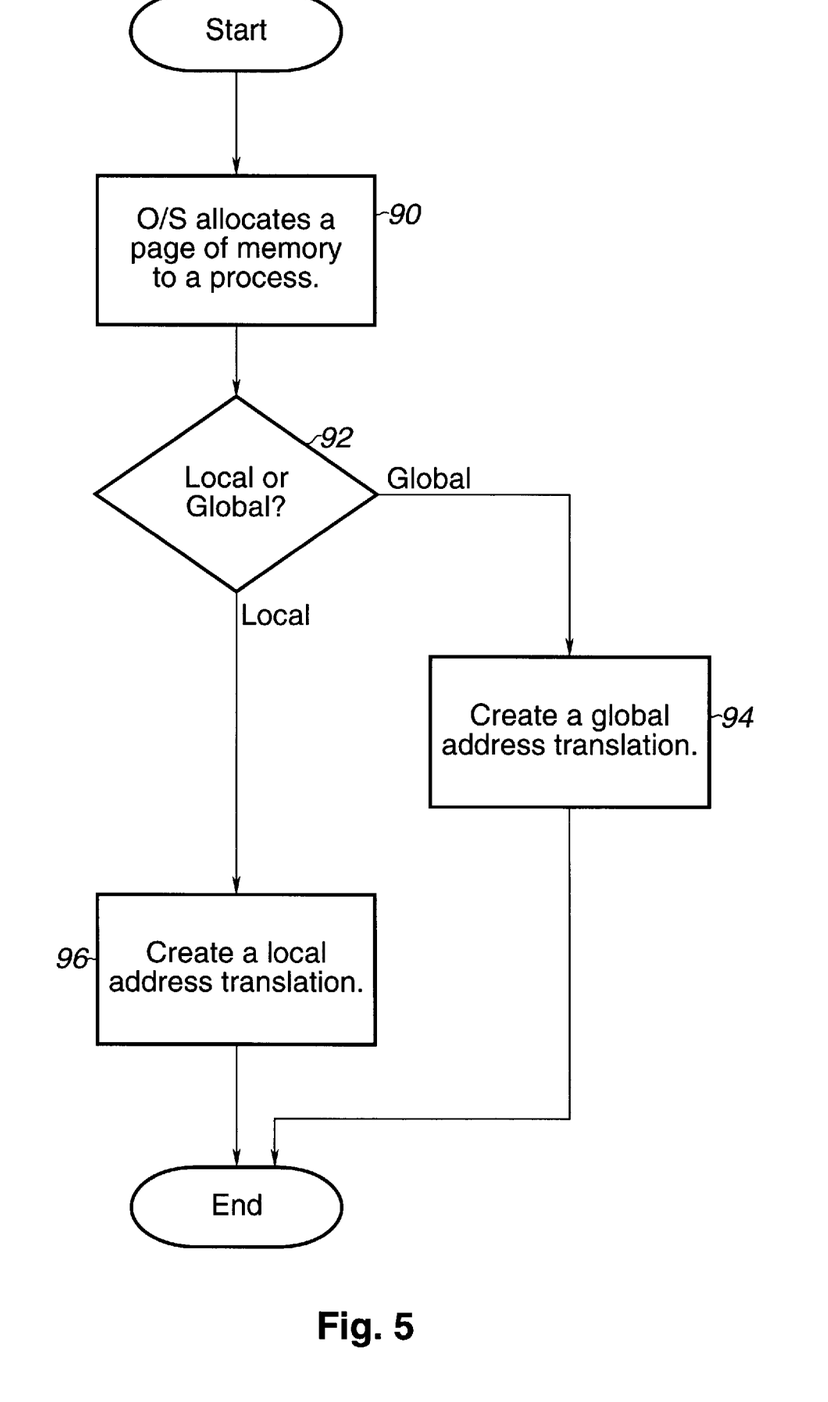
FIG. 5 is a flowchart depicting operation of an operating system upon the computer system shown in FIG. 1 according to one embodiment of the present invention.

Turning next to FIG. 5, a flow diagram depicting a portion of the operation of an operating system in accordance with one embodiment of the present invention is shown. The portion shown in FIG. 5 depicts the activities performed when a page of memory is allocated to a process. A page may be allocated via an explicit request by the process being executed. Alternatively, a certain number of pages may be automatically allocated upon initiation of a process.

During a step 90, the operating system selects a page for allocation to the process. Generally, the operating system maintains a list of "free" pages (i.e. those pages which are not currently allocated to a process). One of the free pages is allocated to the process. If no pages are free, the operating system selects a currently allocated page, deallocates the page from the process to which it was allocated (including saving the data within the page to disk and invalidating the translation for the page), and allocates the page to the requesting process. Many algorithms are well known for selecting allocated pages for reallocation to a new process, generally known as demand-paged algorithms.

Upon selection of a page to allocate to the process, the operating system determines if the page should be allocated as local or global (step 92). A variety of algorithms may be used to select local versus global. As described in detail below, one scheme involves allocating pages as local initially, then changing the allocation to global upon occurrence of a trap during an attempt to access the page. Another scheme involves allocating pages as global initially, and later determining which pages to change to local based upon usage of the page by various nodes. It is noted that any suitable scheme may be employed.

If a page is determined to be global, then (as illustrated in a step 94) the operating system creates a global address translation (i.e. a translation to an address within SS space 72, RR space 76, or RS space 78). If the page table structure employed by the computer system is such that each processor or each node has its own page table structure, the translation is placed into all page table structures. Alternatively, the operating system may determine that the page should be local. As illustrated in a step 96, the operating system creates a local translation available only within the local domain. In the exemplary page table structure described above, the translation is placed only in the page table structure of the node containing the memory. If processors in other nodes attempt to access the address, no translation will be found in their page table structures and a trap will occur.

Figure 6:
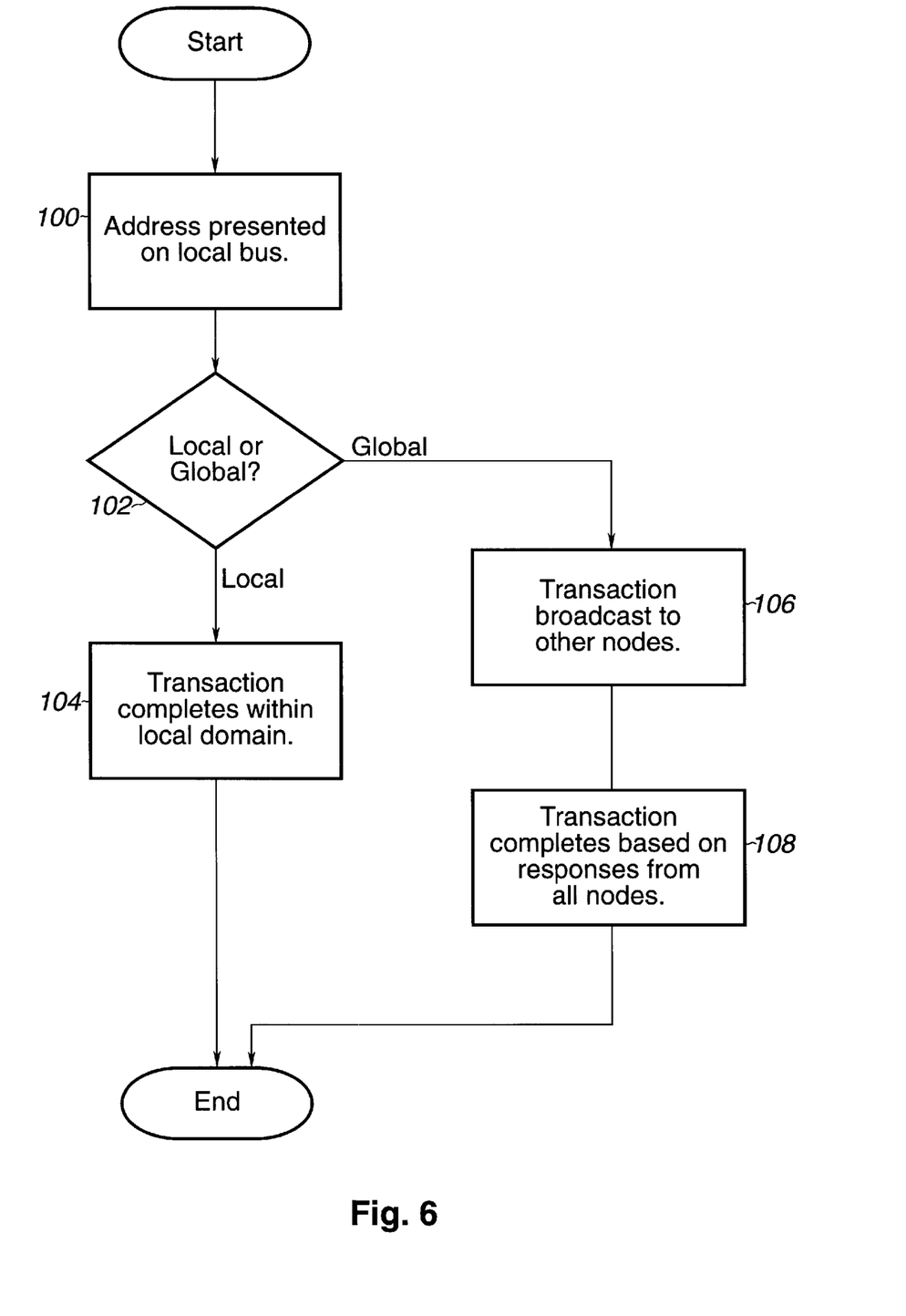
FIG. 6 is a flowchart depicting operation of a repeater in the computer system shown in FIG. 1 according to one embodiment of the present invention.

Turning next to FIG. 6, a flow diagram depicting operation of top repeater 12 in accordance with one embodiment of the present invention is shown. During a step 100, a repeater 14 detects an address of a transaction being presented upon the corresponding local bus 16. The repeater 14 transmits the address to top repeater 12. As illustrated in step 102, top repeater 12 determines if the address is local or global by determining which of the address partitions depicted in FIG. 4 contains the address.

If the address is within a local address partition (e.g. LS address partition 74 for the address space depicted in FIG. 4) then top repeater 12 does not transmit the transaction to repeaters 14 outside of the local domain from which the address emanates. Instead, repeaters 14 within the local domain receive the transaction and those outside the domain do not. As illustrated in step 104, the transaction completes within the local domain. Alternatively, the address may be within a global address partition (e.g. SS address partition 72, RR address partition 76, or RS address partition 78 for the address space depicted in FIG. 4). As illustrated in step 106, top repeater 12 broadcasts the transactions to all other nodes. The transaction subsequently completes based upon responses from all nodes, not just from the local node (step 108).

It is advantageous to modify the designation of memory as local or global. For example, if two processes are both accessing a page of data designated as local memory, that page is being moved from one node to another using RR address aliases each time a different process accesses it. In this case, it would be advantageous to designate that page of data as global. In addition, a page accessed by one process and only designated as global memory unnecessarily wastes bandwidth. Because the number of processes accessing a memory block changes, a method of dynamically changing the designation of memory blocks is desirable.

Several algorithms can be used for dynamically changing the designation of memory. In one embodiment, all pages of memory are originally designated as local and a counter keeps track of how many times a page is moved due to improper accesses using LS address aliases. When a threshold has been reached, the page is converted to global and no more block moves are required. In another embodiment each page is started off with a global designation. Pages are individually changed to local one at a time. Pages are then converted back to global using the algorithm discussed above. In yet another alternative, pages may be initially set to local and change to global as traps occur.

In one specific embodiment, address partitions are used to prevent a software bug in one node from corrupting data in another node. In this embodiment, only LS 306 and RR 308 address partitions are employed. This is performed by configuring the repeaters 14 such that only RR address aliases are broadcast. Each node runs its own kernel of the operating system. A kernel is a portion of the operating system encompassing a nucleus of the basic operating system functions. Each kernel is resident in the local memory of that node and is designated as local memory space. Therefore, nodes can only access the kernel of another node using read-only instructions. If a process on one node attempts to access the kernel of another node, the repeater will not broadcast the data request. The kernel can only be accessed from remote nodes using RR (read-only) address aliases. In this manner, a software bug running on one node cannot crash the kernel or any applications running on different nodes.

Any communications between nodes is performed in a poll based manner. Each node designates a memory location to store status bits indicating that the node has data for a process running on another node. The other processes periodically poll these status bits using RR address aliases, which are read only. When a process detects that another node has data for that process, the data is read using RR aliases. In this manner, data is transferred between nodes without any node having write access to another node. Therefore, corrupted software in one node is unable to write data to other nodes in the hierarchical bus, and corrupted software on one node is unable to corrupt software in other nodes. Alternatively, global interrupts may be supported between the processors instead of the poll-based scheme.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

Numerous variations and modifications will become apparent to those skilled in the art once the above disclosure is fully appreciated. It is intended that the following claims be interpreted to embrace all such variations and modifications.

What is claimed is:

1. A multiprocessing computer system comprising:
   a first local domain comprising a first processor and a first memory, wherein said first processor is configured to access a memory location within said first memory in a read/write mode via a first address within a local address partition of an address space employed by said multiprocessing computer system;
   a second local domain comprising a second processor, wherein said second processor is configured to access said memory location in a read-only mode via a second address within a read-only address partition of said address space; and
   a first repeater coupled between said first local domain and said second local domain, said first repeater configured to transmit transactions between said first local domain and said second local domain if said transactions have a corresponding address within said read-only address partition, said first repeater further configured to inhibit transmission of transactions between said first local domain and said second local domain if said transactions have said corresponding address within said local address partition, whereby said second processor is prevented from updating said first memory location.

2. The multiprocessing computer system as recited in claim 1 wherein said second local domain comprises a second repeater coupled between said second processor and said first repeater, said second repeater configured to inhibit a broadcast of a particular transaction having a particular address within a global address partition which is a read/write address partition.

3. The multiprocessing computer system as recited in claim 2 wherein said second local domain further comprises a second memory.

4. The multiprocessing computer system as recited in claim 3 wherein, during use, said first memory stores a first operating system kernel and said second memory stores a second operating system kernel.

5. The multiprocessing computer system as recited in claim 4 wherein said first and second operating system kernels operate independent of one another.

6. The multiprocessing computer system as recited in claim 5 wherein said first and second operating system kernels communicate via said read-only address partition.

7. The multiprocessing computer system as recited in claim 6 wherein said memory location stores at least one status bit, and wherein said second processor polls said status bit using said read-only address partition.

8. The multiprocessing computer system as recited in claim 7 wherein said first processor updates said status bit using said local address partition.

9. The multiprocessing computer system as recited in claim 1 wherein said first local domain further comprises a third repeater coupled between said first processor and said first repeater, a third processor, and a fourth repeater coupled between said third processor and said first repeater.

10. The multiprocessing computer system as recited in claim 9 wherein said third repeater is configured to transmit a first transaction initiated by said first processor to said first repeater.

11. The multiprocessing computer system as recited in claim 10 wherein said first repeater routes said first transaction to said fourth repeater regardless of which address partition contains a first corresponding address corresponding to said first transaction.

12. The multiprocessing computer system as recited in claim 11 wherein said fourth repeater transmits said first transaction to said third processor, whereby said third processor participates in said first transaction.

13. The multiprocessing computer system as recited in claim 12 wherein said third processor participates in said first transaction in order to maintain coherency for said first corresponding address.

14. A method for operating a multiprocessing computer system in a protected mode, comprising:

accessing a memory location within a first local domain by a first processor within said first local domain, said first processor using a first address included within a local address partition having a read/write mode for said memory location;

accessing said memory location by a second processor within a second local domain, said second processor using a second address included within a global read-only address partition having a read-only mode for said memory location; and preventing an access by said second processor using a third address included within a global read/write address partition by preventing transmittal of said access form said second local domain to said first local domain, whereby said second processor is prevented from updating said memory location.

15. The method as recited in claim 14 further comprising running a first operating system kernel within said first local domain and a second operating system kernel within said second local domain.

16. The method as recited in claim 15 wherein said first operating system kernel and said second operating system kernel operate independently.

17. The method as recited in claim 16 wherein said first operating system kernel and said second operation system kernel communicate via said read-only address partition.

* * * * *